(12) United States Patent
Okuyama

(10) Patent No.: US 7,599,459 B2
(45) Date of Patent: Oct. 6, 2009

(54) RECEIVING APPARATUS, DATA TRANSMISSION SYSTEM AND RECEIVING METHOD

(75) Inventor: Ken Okuyama, Ichikawa (JP)

(73) Assignee: Kabushiki Kaisha Toshiba (JP)

( * ) Notice: Subject to any disclaimer, the term of this patent is extended or adjusted under 35 U.S.C. 154(b) by 616 days.

(21) Appl. No.: 11/436,300

(22) Filed: May 17, 2006

(65) Prior Publication Data

US 2006/0280274 A1    Dec. 14, 2006

(30) Foreign Application Priority Data

May 17, 2005    (JP) .......................... P2005-144655

(51) Int. Cl.
*H04L 7/00* (2006.01)
*G06F 1/00* (2006.01)
*G06F 1/04* (2006.01)
*G06F 1/12* (2006.01)
*G06F 1/14* (2006.01)
*G06F 1/24* (2006.01)
*H04J 3/06* (2006.01)

(52) U.S. Cl. .................... 375/372; 375/354; 713/500; 713/501; 713/502; 713/503; 713/600; 370/503; 370/508

(58) Field of Classification Search ................. 375/148, 375/354, 372; 713/500–503

See application file for complete search history.

(56) References Cited

U.S. PATENT DOCUMENTS

| 5,323,426 | A | * | 6/1994 | James et al. ................ 375/372 |
| 6,735,240 | B1 | * | 5/2004 | Kang ......................... 375/148 |
| 6,766,464 | B2 | * | 7/2004 | Collier ....................... 713/503 |
| 2005/0111604 | A1 | | 5/2005 | Okuyama |
| 2005/0188146 | A1 | * | 8/2005 | Teo ................................ 711/5 |
| 2006/0023825 | A1 | * | 2/2006 | Kato et al. .................. 375/372 |

OTHER PUBLICATIONS

Low-power clock-deskew buffer for high-speed digital circuits. Shen-luan Liu; Jiunn-Hwa Lee; Hen-Wai Tsao; Solid-State Circuits, IEEE Journal of vol. 34, Issue 4, Apr. 1999 pp. 554-558.*

* cited by examiner

*Primary Examiner*—Mohammad H Ghayour
*Assistant Examiner*—Eboni Giles
(74) *Attorney, Agent, or Firm*—DLA Piper LLP (US)

(57) ABSTRACT

A receiving apparatus receives data sequences, each of which includes plural data blocks, from plural transmission lines, respectively. The apparatus includes plural elastic buffers and a deskew circuit. The corresponding data sequence is written into each elastic buffer. A predetermined number of consecutive timing control symbols are inserted into the data sequences as markers for data blocks to be read from the data sequences at the same cycle. The elastic buffers adjust numbers of the timing control symbols included in the written data sequences, respectively. The data sequences, in each of which the number of the timing control symbols has been adjusted, are read from the elastic buffers in synchronization with a reading clock. The data sequences are written into the deskew circuit. The deskew circuit adjusts the number of the timing control symbols included in each data sequence so as to be equal to the predetermined number.

8 Claims, 7 Drawing Sheets

RECEIVING APPARATUS, DATA TRANSMISSION SYSTEM AND RECEIVING METHOD

CROSS-REFERENCE TO RELATED APPLICATIONS

This application is based upon and claims the benefit of priority from the Japanese Patent Application No. 2005-144655 filed on May 17, 2005; the entire contents of which are incorporated herein by reference.

BACKGROUND OF THE INVENTION

1. Field of the Invention

The present invention relates to a receiving apparatus to be connected to plural transmission lines, a data transmission system including the receiving apparatus and a receiving method.

2. Description of the Related Art

The synchronization using an elastic buffer is commonly employed in serial communication. In this synchronization, a margin and a jitter between two systems of clocks of a transmitting apparatus and a receiving apparatus are compensated for by symbol addition/removal.

Where elastic buffers are used in a communication using plural transmission lines (see U.S. Pat. No. 5,323,426, for example), it is usually aimed to cause the elastic buffers to perform symbol addition/removal at the same time for all the transmission lines. However, in the case of a communication in which serial data to be transmitted do not have CLK information, the receiving apparatus generates reception clocks for the respective transmission lines. However, it is difficult to make the reception clocks for the respective transmission lines completely identical. That is, the reception clock for each transmission line has a jitter and the elastic buffers perform symbol addition/removal on a transmission line basis, and the symbol addition/removal by the elastic buffers may cause skews between the transmission lines.

SUMMARY OF THE INVENTION

According to an aspect of the invention, a receiving apparatus receives data sequences each of which comprises a plurality of data blocks from a plurality of transmission lines, respectively. The apparatus includes a plurality of elastic buffers and a deskew circuit. The corresponding data sequence is written into each of the plurality of elastic buffers. Predetermined number of consecutive timing control symbols are inserted into the respective data sequences as markers for data blocks to be read from the respective data sequences at the same cycle. The elastic buffers adjust numbers of the timing control symbols included in the written data sequences, respectively. The data sequences in each of which the number of the timing control symbols has been adjusted are read from the elastic buffers in synchronization with a reading clock. The data sequences read from the elastic buffers are written into the deskew circuit. The deskew circuit adjusts the number of the timing control symbols included in each data sequence so as to be equal to the predetermined number. The data sequences—in each of which the number of the timing control symbols has been adjusted to be equal to the predetermined number—are read from the deskew circuit at the same cycle in synchronization with the reading clock using the timing control symbols as the markers.

According to another aspect of the invention, a data transmission system includes a plurality of transmission lines, a transmitting apparatus and the receiving apparatus. The transmitting apparatus divides data into a plurality of data sequences and outputs the data sequences through the transmission lines, respectively. The receiving apparatus is connected to the transmitting apparatus through the transmission liens.

According to a still another aspect of the invention, a method for receiving data sequences each of which comprises a plurality of data blocks from a plurality of transmission lines, respectively, includes: writing into each of a plurality of elastic buffers the corresponding data sequence, a predetermined number of consecutive timing control symbols being inserted into the respective data sequences as markers for data blocks to be read from the respective data sequences at the same cycle; adjusting numbers of the timing control symbols included in the written data sequences, respectively, reading from the elastic buffers the data sequences in each of which the number of the timing control symbols has been adjusted in synchronization with a reading clock; writing into a deskew circuit the data sequences read from the elastic buffers; adjusting the number of the timing control symbols included in each data sequence so as to be equal to the predetermined number; and reading the data blocks from the deskew circuit at the same cycle in synchronization with the reading clock using the timing control symbols as the markers.

DETAILED DESCRIPTION OF EMBODIMENTS OF THE INVENTION

Figure 1:
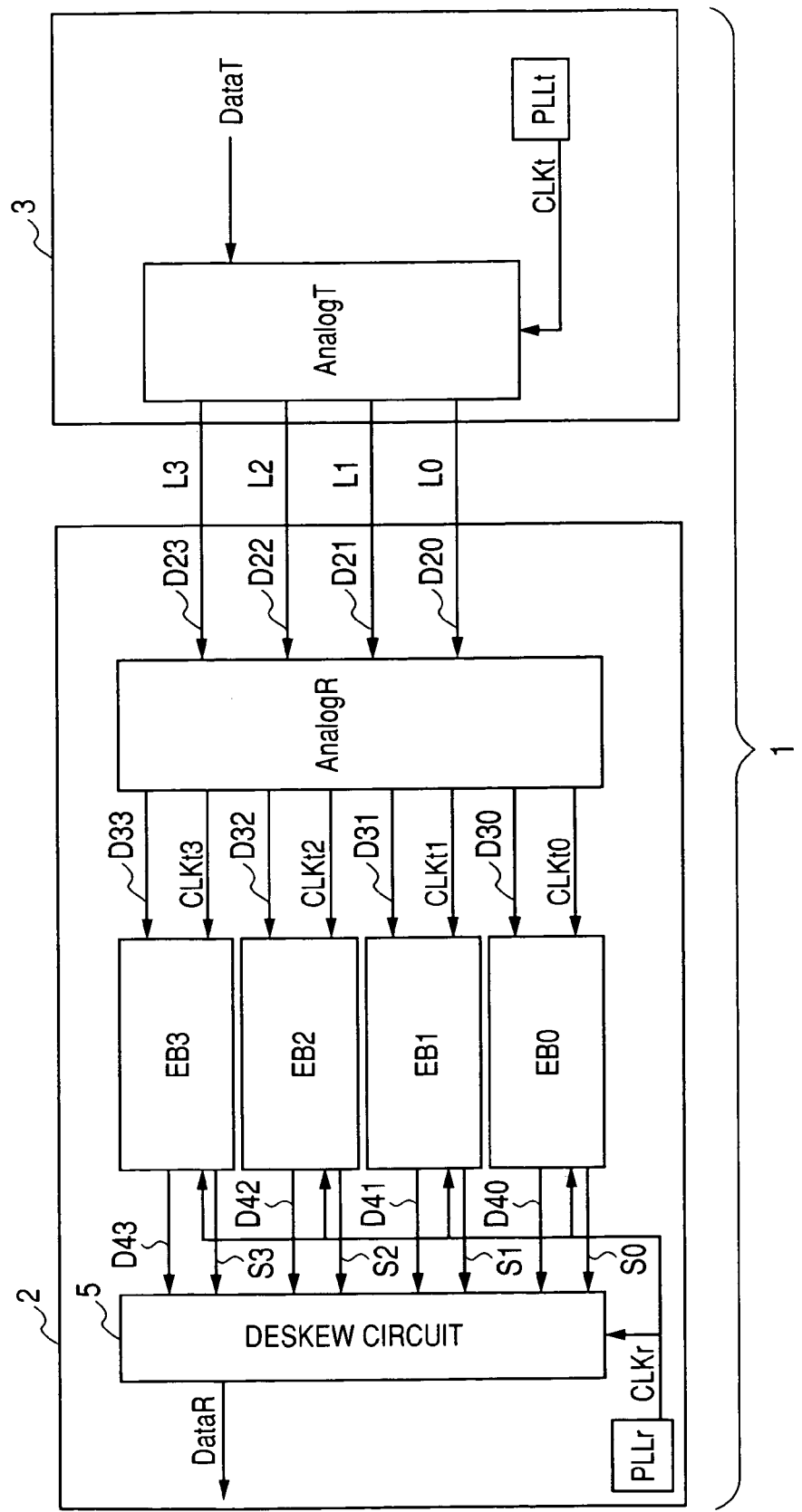
FIG. 1 shows the configuration of a transmission system and a receiving apparatus according to a first embodiment.

Next, an embodiment of the present invention will be described with reference to the drawings. Although the embodiment of the invention will be described below with reference to the drawings, the drawings are intended only for illustration and the invention is not limited by the drawings. In the drawings, the same or similar components are given the same or similar reference symbol. The drawings are schematic ones, and attention should be paid to the fact that a relationship between a thickness and dimensions on a plane, the ratio between the thicknesses of respective layers, etc. are different from real ones.

As shown in FIG. 1, a transmission system 1 has a receiving apparatus 2, a transmitting apparatus 3, and plural transmission lines L0-L3, which connect the receiving apparatus 2 and the transmitting apparatus 3.

The transmitting apparatus 3 has a transmission clock generation circuit PLLt and a transmission analog circuit AnalogT.

The receiving apparatus 2 has a reception analog circuit AnalogR, a read clock generation circuit PLLr, elastic buffers EB0-EB3, and a deskew circuit 5.

The transmission clock generation circuit PLLt generates a transmission clock CLKt.

The transmission analog circuit AnalogT receives a first data sequence DataT and divides it into plural data blocks. The transmission analog circuit AnalogT converts the divided data blocks into four second data sequences D20-D23 number of which is equal to that of the transmission lines L0-L3 by rearranging the divided data blocks in parallel while dividing those. The number of transmission lines L0 to L3 is not limited to four and may be any plural number. Any dividing method may be employed as long as it enables restoration of the first data sequence DataT from the second data sequences D20-D23. The transmission analog circuit AnalogT inserts timing control symbols into all the second data sequences D20-D23. Any timing control symbols insertion method may be employed as long as the second data sequences D20-D23 in which the timing control symbols are not inserted can be restored from the timing-control-symbols-inserted second data sequences D20-D23 and the first data sequence DataT can be restored from the second data sequences D20-D23 according to the timing control symbols insertion method and the dividing method. The transmission analog circuit AnalogT sends the second data sequences D20-D23 over the respective transmission lines L1-L3 in synchronism with the transmission clock CLKt. Each of the transmission lines L1-L3 transmits, as serial data, the second data sequence D20, D21, D22, or D23.

The reception analog circuit AnalogR receives the data blocks and the timing control symbols of the data sequences D20-D23 on a transmission line basis in order and sends out resulting data sequences D30-D33. The data sequences D30-D33 corresponding to the respective transmission lines L0-L3 are sent out as parallel data after being subjected to serial-parallel conversion. The reception analog circuit AnalogR generates plural write clocks CLKt0-CLKt3 for the respective transmission lines L1-L3 on the basis of the data blocks corresponding to the respective transmission lines L1-L3 and at least one timing control symbol.

The read clock generation circuit PLLr generates a read clock CLKr, which is approximately the same as the transmission clock CLKt.

The elastic buffers EB0-EB3, which are the same in number as the transmission lines L1-L3, receive the data sequences D30-D33. The data blocks and timing control symbols TC (whose number is equal to an elastic symbol number, which is larger or smaller than a transmission symbol number (number of the timing control symbol included in each of the second data sequences D20-D23) by one) are written into the elastic buffers EB0-EB3 in synchronism with the write clocks CLKt0-CLKt3 in order in which they are arranged in the second data sequences D20-D23. The data blocks and the timing control symbols TC are read from the elastic buffers EB0-EB3 in synchronism with the read clock CLKr in order in which they are arranged in the second data sequences D20-D23.

The deskew circuit 5 makes the number of timing control symbols TC (desckew symbol number) equal to the transmission symbol number by increasing or decreasing the elastic symbol number by one. This makes it possible to restore the pre-transmission second data sequences S20-S23. Further, the first data sequence DataT can be restored from the second data sequences S20-S23 by combining the second data sequences S20-S23 according to the procedure that is reverse to the procedure of the dividing method by which the second data sequences S20-S23 were generated and removing the timing control symbols according to the procedure that is reverse to the procedure of the timing control symbols insertion method. A third data sequence DataR, which is generated by the deskew circuit 5, is the restored first data sequence DataT.

Figure 2:
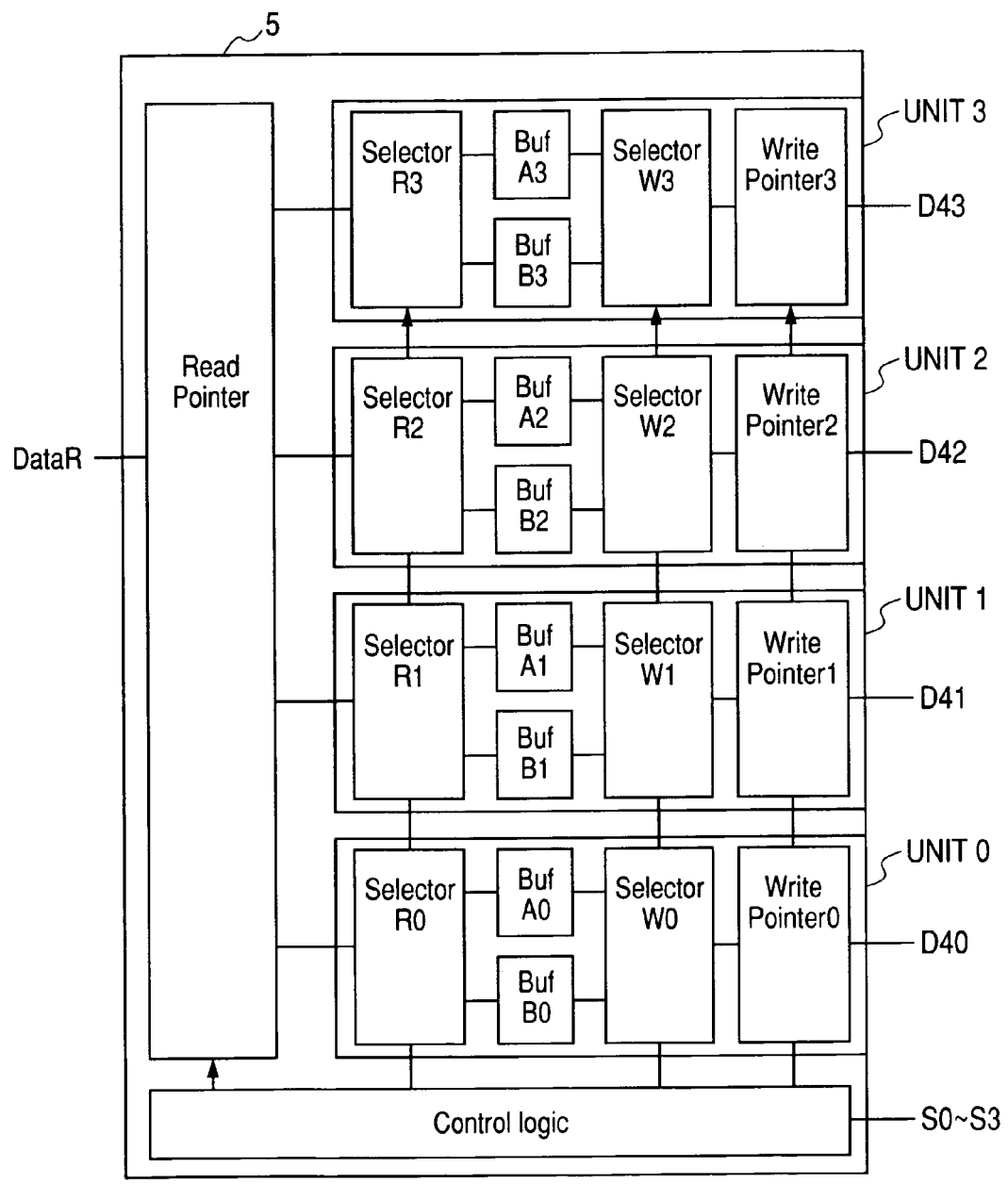
FIG. 2 shows the configuration of a deskew circuit of the receiving apparatus according to the first embodiment.

As shown in FIG. 2, the deskew circuit 5 has plural deskew buffers BufA0-BufA3 and BufB0-BufB3, plural write pointers WritePointer0-WritePointer3, a read pointer ReadPointer, plural write selectors SelectorW0-SelectorW3, plural read selectors SelectorR0-SelectorR3, and a control circuit Control Logic. The deskew buffers BufA0-BufA3 and BufB0-BufB3 are parts of two-plane first-in first-out (FIFO) buffer unit-0 to unit-4 (the same in number as the transmission lines L0-L3).

Timing control symbols and data blocks are written to the deskew buffers BufA0-BufA3 and BufB0-BufB3.

The write pointers WritePointer0-WritePointer3 specify writing positions of the deskew buffers BufA0-BufA3 and BufB0-BufB3. If the elastic symbol number is larger than the transmission symbol number, plural timing control symbols TC are written to one writing position. If the elastic symbol number is smaller than the transmission symbol number, one timing control symbol TC is written to plural writing positions.

The write selectors SelectorW0-SelectorW3 select one of the deskew buffers BufA0-BufA3 and the deskew buffers BufB0-BufB3 to which timing control symbols TC and data blocks are written.

The read selectors SelectorR0-SelectorR3 select one of the deskew buffers BufA0-BufA3 and the deskew buffers BufB0-BufB3 from which timing control symbols TC and data blocks are read.

The read pointer ReadPointer specifies reading positions of the deskew buffers BufA0-BufA3 and the deskew buffers BufB0-BufB3.

For example, if the write selectors SelectorW0-SelectorW3 select the deskew buffers BufA0-BufA3, timing control symbols TC and data blocks are written in writing positions of the deskew buffers BufA0-BufA3 specified by the write pointers WritePointer0-WritePointer3.

The write selectors SelectorW0-SelectorW3 select the deskew buffers BufB0-BufB3 immediately before the timing control symbols TC are written.

Timing control symbols TC and data blocks are read from reading positions, specified by the read pointer ReadPointer, of the deskew buffers BufA0-BufA3 selected by the read selectors SelectorR0-SelectorR3.

The read selectors SelectorR0-SelectorR3 select the plural deskew buffers BufB0-BufB3 simultaneously if the reading positions coincide with a position immediately before another position where the timing control symbol TC is written.

The timing control symbols TC are written into the deskew buffers BufB0-BufB3.

The timing control symbols TC are read from the deskew buffers BufB0-BufB3 after they are written thereto.

When the elastic buffers EB0-EB3 have decreased by one, the elastic symbol number that was equal to the transmission symbol number, the control circuit Control Logic sets a status flag on a transmission line basis. When status flags have been set for all the transmission lines L0-L3, the timing control symbols TC are read from none of the deskew buffers BufA0-BufA3 or none of the deskew buffers BufB0-BufB3. The control circuit Control Logic may control the write pointers WritePointer0-WritePointer3, the read pointer ReadPointer, the write selectors SelectorW0-SelectorW3, and the read selectors SelectorR0-SelectorR3.

If data blocks are synchronized with each other by using timing control symbols TC in the elastic buffers EB0-EB3 in a serial communication using the plural transmission lines L0-L3 as described above, skews may occur among the transmission lines L0-L3 because a margin and a jitter between the clocks CLKt and CLKr of the two systems, that is, the transmitting system and the receiving system, are compensated for by addition/removal of timing control symbols TC.

Figure 3:
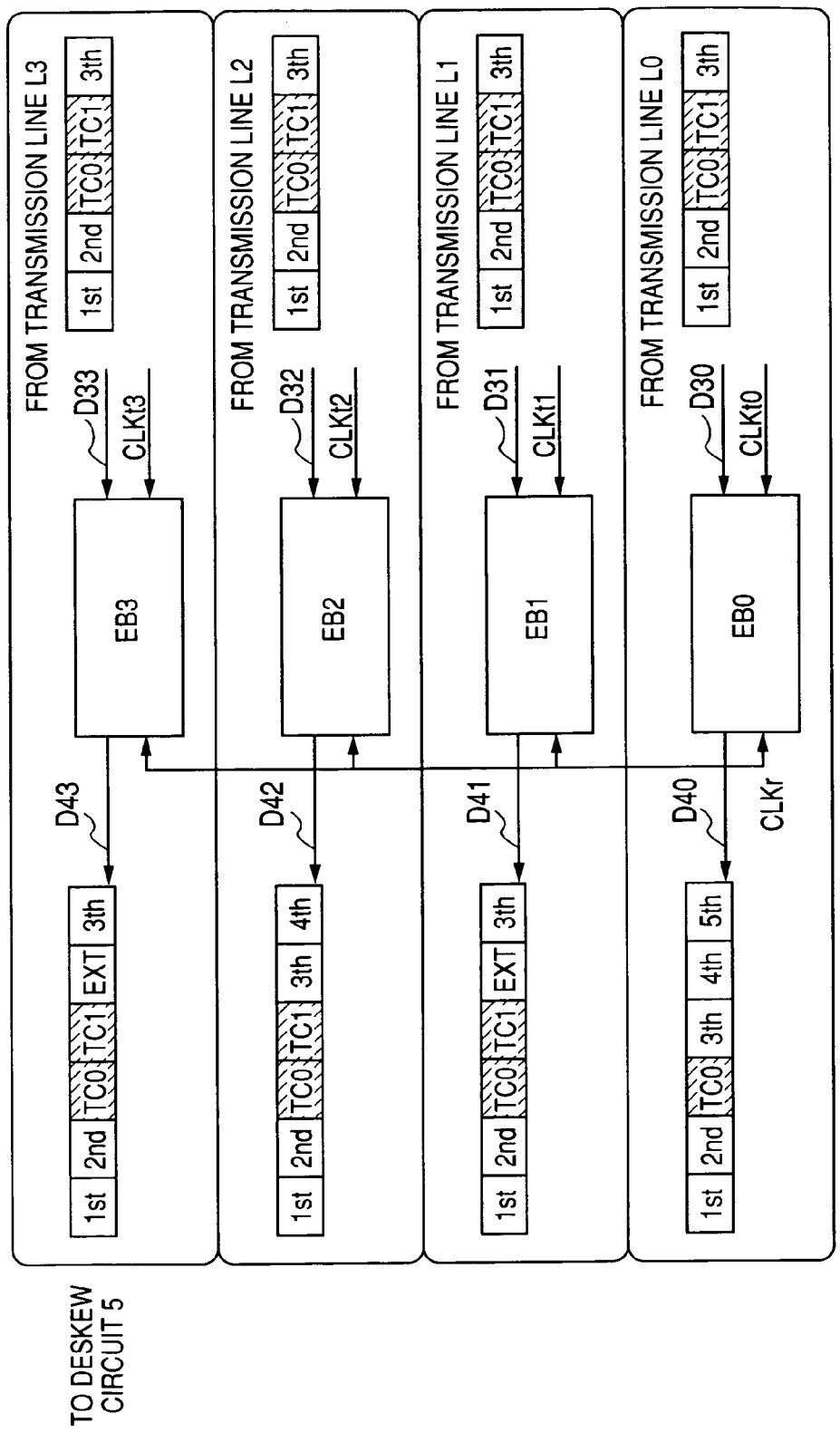
FIG. 3 illustrates the function of elastic buffers of the receiving apparatus according to the first embodiment.

A description will be made below of how skews occur between the transmission lines L0-L3 because of the use of the elastic buffers EB0-EB3. As shown in FIG. 3, data sequences D30-D33 are sent from the transmitting side to the elastic buffers EB0-EB3. Clocks CLKt0-CLKt3 are also sent from the transmitting side to the elastic buffers EB0-EB3 in synchronism with the respective data sequences D30-D33. The clocks CLKt0-CLKt3 are clock signals, which are generated by the reception analog circuit AnalogR so as to be in synchronism with received data sequences D20-D23. Each of the data sequences D30-D33 has, in order of transmission, data blocks 1st and 2nd, timing control symbols TC0 and TC1, and a data block 3rd. In this manner, the same number of (i.e., two) timing control symbols TC0 and TC1 are sent over all the transmission lines L0-L3. The data sequences D30-D33 are written into the elastic buffers EB0-EB3 in synchronism with the clock CLKt0-CLKt3. The data sequences D30-D33 thus written are read from the elastic buffers EB0-EB3 in synchronism with a clock CLKr as data sequences D40-D43. The case where the clocks CLKt0-CLKt3 are deviated in frequency from the clock CLKr will be considered below.

The clocks CLKt1 and CLKt3 corresponding to the transmission lines L1 and L3 are lower in frequency than the clock CLKr. The elastic buffers EB1 and EB3 are rendered in an underflow state. To resolve the underflow state, each of the elastic buffers EB1 and EB3 adds a timing control symbol EXT at the time of reading.

The clock CLKt0 corresponding to the transmission line L0 is higher in frequency than the clock CLKr. The elastic buffer EB0 is rendered in an overflow state. To resolve the overflow state, the elastic buffer EB0 removes the timing control symbol TC1 at the time of reading.

The clock CLKt2 corresponding to the transmission line L2 is the same in frequency as the clock CLKr. The elastic buffer EB0 is not rendered in an overflow state or an underflow state. The elastic buffer EB0 need not add or remove a timing control symbol TC at the time of reading.

Attention is now paid to the data sequences D40-D43. The data blocks 3rd corresponding to the respective transmission lines L0-L3 are read out at different time points, though they are expected to be output in the same cycle. This means occurrence of skews. As seen from this example, a serial communication using the plural transmission lines L0-L3 requires the deskew circuit 5 for deskewing deviations (skews) between time points when data blocks 3rd are read out.

Figure 4:
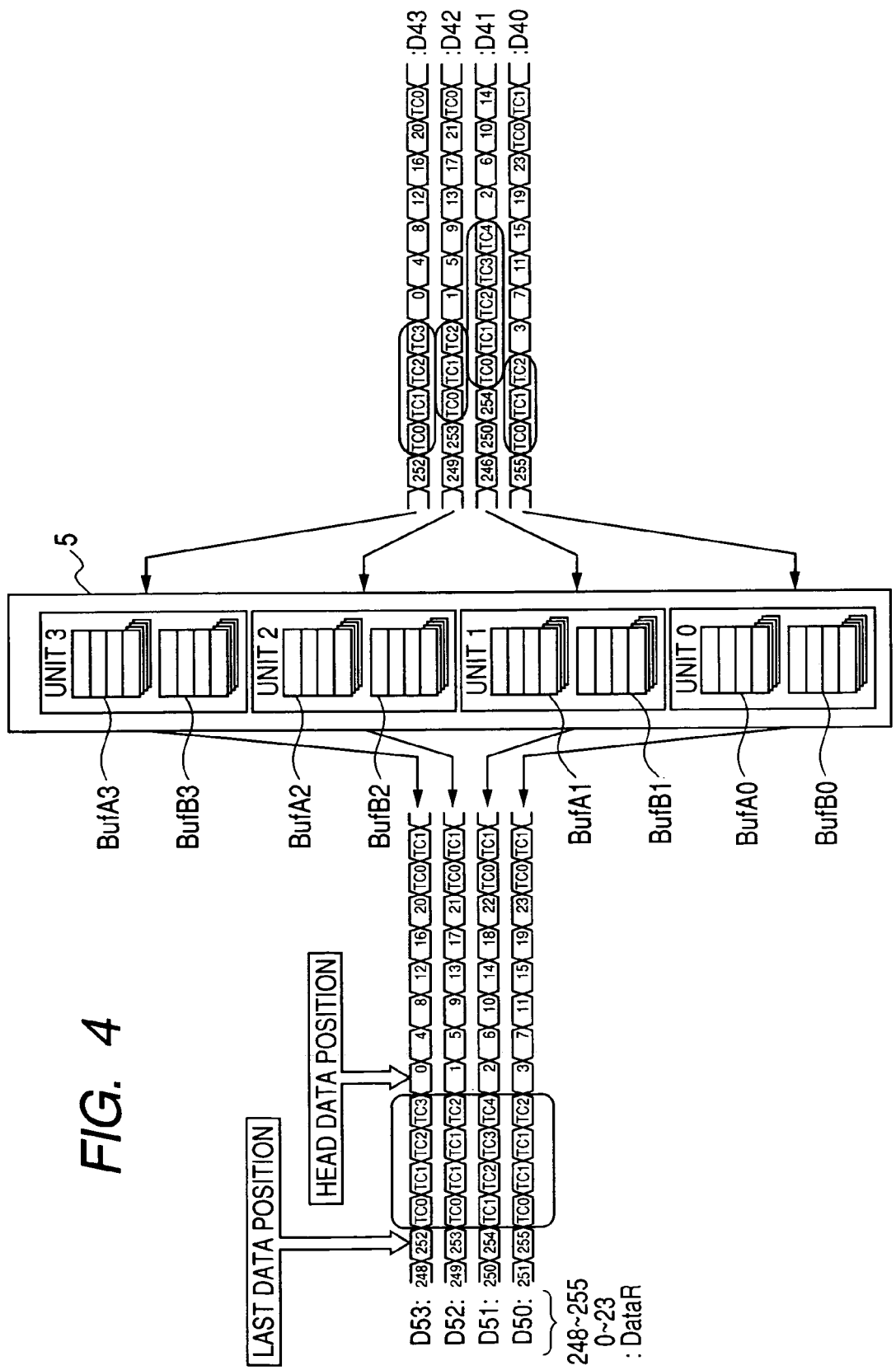
FIG. 4 illustrates the function of the deskew circuit of the receiving apparatus according to the first embodiment.

As shown in FIG. 4, the deskew circuit 5 can resolve skews occurring between the plural transmission lines L0-L3 and thereby realize a serial communication using the transmission lines L0-L3 and the elastic buffers EB0-EB3.

Assume that four timing control symbols TC0, TC1, TC2, TC3 are sent from the transmitting apparatus 3. The elastic buffers EB0-EB3 perform write and read timing adjustments using the timing control symbols TC0, TC1, TC2, TC3. Resulting output data sequences D40-D43 are shown in FIG. 4. The data sequences D40-D43 have skews; that is, those data blocks of the data sequences D40-D43 which are read out at the same time point are not in order, that is, the positions of sequential data blocks corresponding to the transmission lines L0-L3 are deviated from each other. For example, although data blocks 252-255 are sent in the same cycle from the transmitting apparatus 3 shown in FIG. 1, the data blocks 252-255 in the data sequences D40-D43 shown in FIG. 4 are not received in the same cycle by the deskew circuit 5. Likewise, although data blocks 0-3 are sent in the same cycle from the transmitting apparatus 3 shown in FIG. 1, the data blocks 0-3 in the data sequences D40-D43 shown in FIG. 4 are not received in the same cycle by the deskew circuit 5.

The elastic buffers EB0-EB3 add or remove a timing control symbol to or from timing control symbols TC0-TC3 on a transmission line basis. Therefore, the number of timing control symbols TC0 etc. depends on the transmission line. The data sequence D40 has three timing control symbols TC0, TC1, and TC2. The data sequence D41 has five timing control symbols TC0, TC1, CT2, TC3, and TC4. The data sequence D42 has three timing control symbols TC0, TC1, and TC2. The data sequence D43 has four timing control symbols TC0, TC1, CT2, and TC3. These differences in the number of timing control symbols are a factor of causing skews between the data sequences following the timing control symbols TC0 etc. Therefore, the skew situation after the timing control symbols TC0 etc. is different from that before the timing control symbols TC0 etc.

On the other hand, the data sequences D50-D53 which are output from the deskew circuit 5 have the same number of (i.e., four) timing control symbols TC0, TC1, CT2, and TC3. The end positions of the data blocks 252-255 coincide with each other for all the transmission lines L0-L3, and so do the start positions of the data blocks 0-3. It is necessary that the type and the number of timing control symbols TC0 etc. that are sent from the transmitting apparatus 3 be defined for each communication scheme using the transmission lines L0-L3.

The details of the function of the deskew circuit 5 will be described below in a specific manner. First, an address pointer control will be described in which two kinds of controls, that is, timing control symbol number adjustment processing and read pointer read end location detection processing, are performed. A buffer switching control will be described next in which two kinds of controls, that is, a write-side switching timing control by the write pointers WritePointer0 to WritePointer3 and a read-side switching timing control by the read pointer ReadPointer, are performed.

(Timing Control Symbol Number Adjustment Processing)

The elastic symbol numbers, i.e., numbers of the timing control symbols TC0 output from the elastic buffers EB0-EB3 corresponding to the plural transmission lines L0-L3 vary in the range of the transmission symbol number, i.e., numbers of timing control symbols TC0 etc. sent from the transmitting apparatus 3 plus and minus one. In the example of FIG. 4, when four timing control symbols TC0, TC1, TC2, and TC3 are sent from the transmitting apparatus 3 to all the transmission lines L0-L3, five symbols are output from the elastic buffer EB1 corresponding to the transmission line L1 (a timing control symbol TC4 has been added by the elastic buffer EB1). Three symbols are output from each of the elastic buffers EB0 and EB2 corresponding to the transmission lines L0 and L2 (the timing control symbol TC3 has been removed by the elastic buffer EB0 or EB2). Four symbols are output from each of the elastic buffer EB3 corresponding to the transmission line L3 (no timing control symbol has been added or removed).

Before writing into the buffers BufA0-BufA3 or BufB0-BufB3, the elastic symbol numbers corresponding to the transmission lines L0-L3 are equalized. That is, the elastic symbol numbers are adjusted so that the four transmission symbols sent from the transmitting apparatus 3 via each of the transmission lines L0-L3 can be written.

Figure 5:
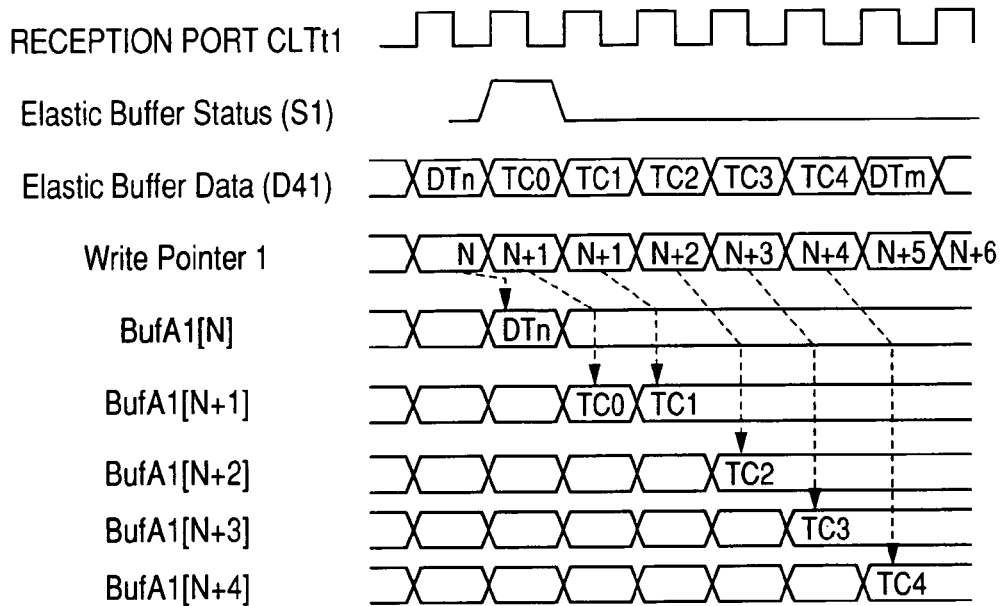
FIG. 5 illustrates processing of decreasing a timing control symbol number in the deskew circuit.

For example, if the four timing control symbols TC0, TC1, TC2, and TC3 have been sent from the transmitting apparatus 3 to all the transmission lines L0-L3 and the timing control symbol TC4 has been added by the elastic buffer EB1 to increase the elastic symbol number to five, a data sequence (elastic buffer data) D41 (see FIG. 5) includes the timing control symbol TC4 as an extra-symbol. When the timing control symbol TC4 is added, the elastic buffer EB1 outputs an elastic buffer status signal S1 indicating the addition of the timing control symbol TC4 to the control circuit Control Logic of the deskew circuit 5. To make the number (deskew symbol number) of timing control symbols to be written to the buffer BufA1 equal to four, the control circuit Control Logic suspends the incrementing of the write pointer WritePointer1 for a one-cycle period.

In the first cycle, a data block DTn of the data sequence D41 is output and the write pointer WritePointer1 outputs an address N.

In the second cycle, the data block DTn is written into the buffer BufA1 at the address N. In the second cycle, the elastic buffer EB1 outputs, to the control circuit Control Logic, an elastic buffer status signal S1 indicating that symbol addition has been made. Further, in the second cycle, a timing control symbol TC0 of the data sequence D41 is output and the write pointer WritePointer1 outputs an address N+1.

In the third cycle, the timing control symbol TC0 is written into the buffer BufA1 at the address N+1. A timing control symbol TC1 of the data sequence D41 is output. Because of the reception of the elastic buffer status signal S1, the write pointer WritePointer1 does not perform address incrementing and outputs the address N+1. That is, the same address as output in the second cycle is output in the third cycle.

In the fourth cycle, the timing control symbol TC1 is written to the buffer BufA1 at the address N+1. A timing control symbol TC2 of the data sequence D41 is output, and the write pointer WritePointer1 outputs an address N+2. In the buffer BufA1, the timing control symbol TC1 is overwritten at the address N+1 (i.e., the timing control symbol TC0 is erased).

In the fifth cycle, the timing control symbol TC2 is written into the buffer BufA1 at the address N+2. A timing control symbol TC3 of the data sequence D41 is output, and the write pointer WritePointer1 outputs an address N+3.

In the sixth cycle, the timing control symbol TC3 is written into the buffer BufA1 at the address N+3. A timing control symbol TC4 of the data sequence D41 is output, and the write pointer WritePointer1 outputs an address N+4.

In the seventh cycle, the timing control symbol TC4 is written into the buffer BufA1 at the address N+4. A data block DTm of the data sequence D41 is output, and the write pointer WritePointer1 outputs an address N+5. In the eighth cycle, the data block D™ is written into the buffer BufA1 at the address N+5.

As described above, the timing control symbols TC1-TC4 are written to the buffer BufA1 but the timing control symbol TC0 is not written to the buffer BufA1. As a result, the number of timing control symbols (deskew symbol number) is four in total. It is noted that to clarify the description the switching between the buffers BufA1 and BufB1 is omitted in the above description.

Figure 6:
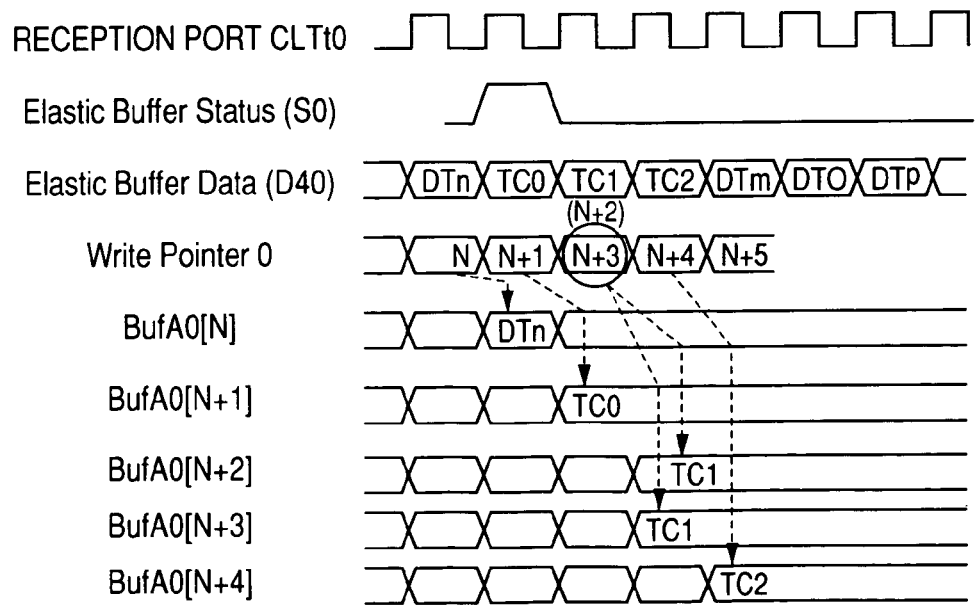
FIG. 6 illustrates processing of increasing the timing control symbol number in the deskew circuit.

Next, a description will be made on the case where four timing control symbols TC0, TC1, TC2, and TC3 have been sent from the transmitting apparatus 3 to all the transmission lines L0-L3 and the timing control symbol TC3 has been removed by the elastic buffer EB0 to decrease the elastic symbol number to three. As shown in FIG. 6, a data sequence (elastic buffer data) D40 does not include the timing control symbol TC3.

When the timing control symbol TC3 is removed, the elastic buffer EB0 outputs an elastic buffer status signal S0 indicating that the timing control symbol TC3 is removed to the control circuit Control Logic of the deskew circuit 5. To make the number (deskew symbol number) of timing control symbols to be written into the buffer BufA0 equal to four, the control circuit Control Logic causes the write pointer WritePointer0 to increment the address by one and then by two in one cycle.

In the first cycle, a data block DTn of the data sequence D40 is output and the write pointer WritePointer0 outputs an address N.

In the second cycle, the data block DTn is written into the buffer BufA0 at the address N. In the second cycle, the elastic buffer EB1 outputs, to the control circuit Control Logic, an elastic buffer status signal S0 indicating that symbol removal has been made. Further, in the second cycle, a timing control symbol TC0 of the data sequence D40 is output and the write pointer WritePointer0 outputs an address N+1.

In the third cycle, the timing control symbol TC0 is written into the buffer BufA0 at the address N+1. A timing control symbol TC1 of the data sequence D40 is output. Because of the reception of the elastic buffer status signal S0, the write pointer WritePointer0 adds one and then another one to the address N+1 and outputs addresses N+2 and N+3.

In the fourth cycle, the timing control symbol TC1 is written into the buffer BufA0 at the address N+2 and furthermore, the timing control symbol TC1 is written into the buffer BufA0 at the address N+3. A timing control symbol TC2 of the data sequence D40 is output, and the write pointer WritePointer0 outputs an address N+4.

In the fifth cycle, the timing control symbol TC2 is written into the buffer BufA0 at the address N+4. A data block D™ of the data sequence D40 is output, and the write pointer WritePointer0 outputs the address N+5. In the sixth cycle, the data block D™ is written to the buffer BufA0 at the address N+5.

As described above, the timing control symbol TC1 is written into the two positions having the addresses N+2 and N+3 of the buffer BufA0 in the same cycle, as a result of which the number of timing control symbols (deskew symbol number) is made equal to four in total. It is noted that to clarify the description the switching between the buffers BufA0 and BufB0 is omitted in the above description.

Where four timing control symbols TC0, TC1, TC2, and TC3 are sent from the transmitting apparatus 3 to all the transmission lines L0-L3 and none of the timing control symbols TC0 etc. are added or removed by the elastic buffers EB0-EB3, none of elastic buffer status signals S0-S3 are generated and the deskew circuit 5 adds or removes none of the timing control symbols TC0 etc.

(Read Pointer Read End Location Detection Processing)

Figure 7:
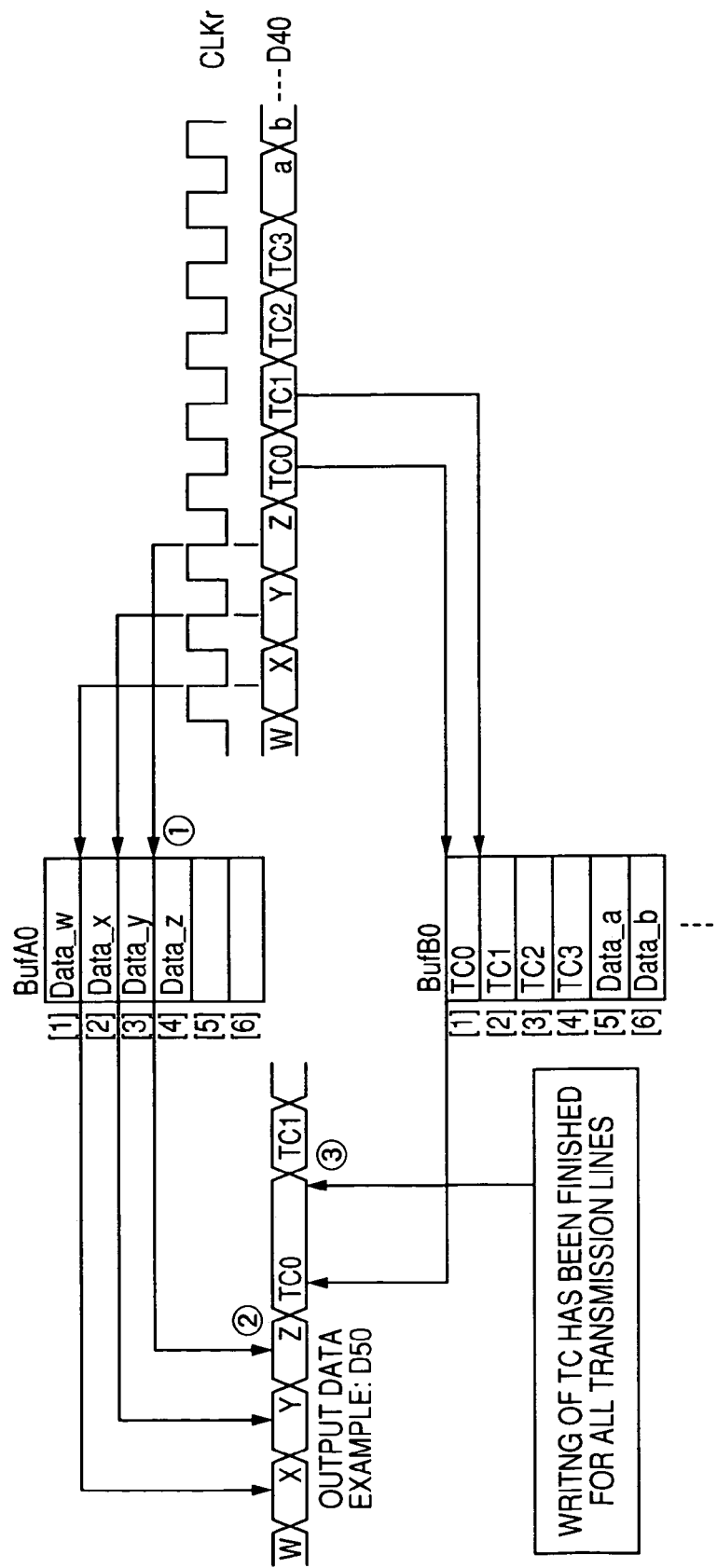
FIG. 7 illustrates timing of switching buffers by a read pointer and selectors of the deskew circuit and a method for specifying reading positions of the buffers.

As shown in FIG. 7, for example, while a data sequence D40, which is output from the elastic buffer EB0, is written to the buffer BufA0, the write selector SelectorW0 selects the other buffer BufB0 at buffer switching timing. After the selection, data are written into the buffer BufB0. During that course, the control circuit Control Logic stores an address indicating what is called an immediately-before-switching writing position of the buffer BufA0 to which data is written last time, that is, immediately before the buffer switching.

The immediately-before-switching writing position corresponds to a final address that the read pointer ReadPointer will specify in reading data from the buffer BufA0. Therefore, the timing at which the reading position specified by the read pointer ReadPointer coincides with the immediately-before-switching writing position is timing at which the read selector SelectorR0 is allowed to switch the buffers, that is, to select the other buffer BufB0. Reading from the buffer BufB0 is thus enabled.

More specifically, a data block W of the data sequence D40 is written to the buffer BufA0 at address 1, a data block X is written to the buffer BufA0 at address 2, a data block Y is written to the buffer BufA0 at address 3, and a data block Z is written to the buffer BufA0 at address 4. Buffer switching timing comes when a timing control symbol TC0 is output, and the write selector SelectorW0 selects the other buffer BufB0. The timing control symbol TC0 of the data sequence D40 is written to the buffer BufB0 at address 1, a timing control symbol TC1 of the data sequence D40 is written to the buffer BufB0 at address 2, and a timing control symbol TC2 of the data sequence D40 is written to the buffer BufB0 at address 3. Likewise, a timing control symbol TC3 and data blocks a and b of the data sequence D40 are written to the buffer BufB0 at addresses 4-6. The control circuit Control Logic stores an immediately-before-switching writing position (1) corresponding to address 4 to which data is written to the buffer BufA0 last time, that is, immediately before the buffer switching.

The data block W of an output data sequence D50 is read from the buffer BufA0 at address 1, the data block X is read from the buffer BufA0 at address 2, the data block Y is read from the buffer BufA0 at address 3, and the data block Z is read from the buffer BufA0 at address 4. When the reading position specified by the read pointer ReadPointer coincides with the immediately-before-switching writing position (1), the read selector SelectorR0 selects the other buffer BufB0. The timing control symbol TC0 of the data sequence D50 is read from the buffer BufB0 at address 1, and the timing control symbol TC1 of the data sequence D50 is read from the buffer BufB0 at address 2. Likewise, the timing control symbols TC2 and TC3 and the data blocks a and b of the data sequence D50 are read from the buffer BufB0 at addresses 3-6.

(Write-side Switching Timing Control)

A description will be made of a control for the switching between the buffers BufA0-BUfA3 and the buffers BufB0-BufB3 in the deskew circuit 5. This control includes two kinds of controls, that is, a write-side switching timing control by the write pointers WritePointer0 to WritePointer3 and a read-side switching timing control by the read pointer ReadPointer. The write-side switching timing control will be described first.

Timing of write-side buffer switching comes when each of the write selectors SelectorW0-SelectorW3 detects a timing control symbol TC0 in a data sequence D40, D41, D42, or D43 which is output from the elastic buffer EB0, EB1, EB2, or EB3. Controls relating to the transmission lines L0-L3 are performed independently of each other.

Figure 8:
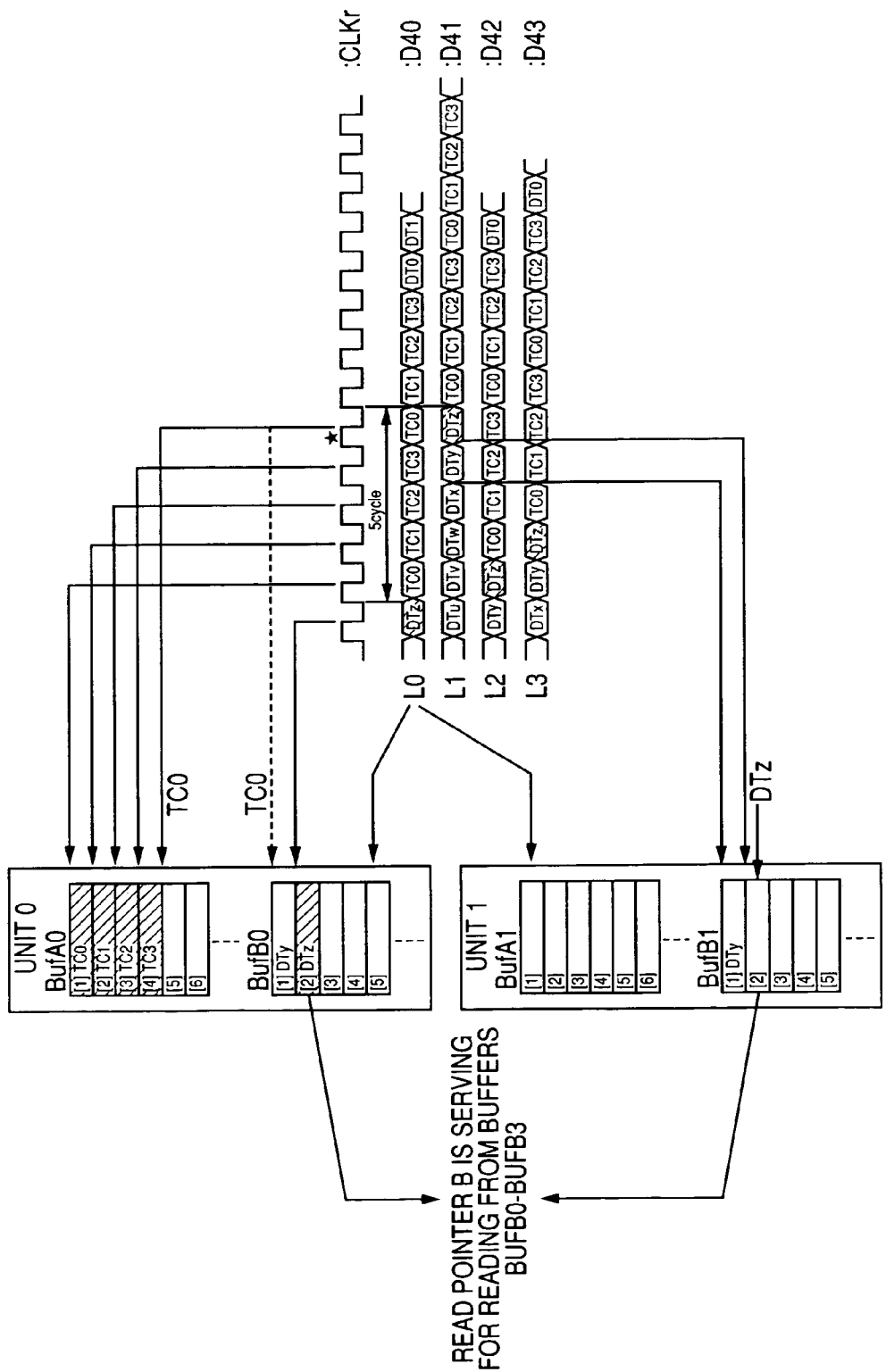
FIG. 8 illustrates writing processing and reading processing that are performed in the deskew circuit when a series of timing control symbols is received two times consecutively.

FIG. 8 shows an example in which a problem may arise in connection with buffer switching timing. For the transmission line L0, a timing control symbol TC0 is detected in the second cycle, whereupon the write buffer is switched from the buffer BufB0 to the buffer BufA0. And a timing control symbol TC0 is detected again in the sixth cycle, that is, at timing indicated by mark "*." At this time, for the transmission line L1, a data block DTz has just been written and a first timing control symbol TC0 has not been detected yet. Therefore, the write buffer has not been switched from the buffer BufB1 to the buffer BufA1 yet. The data blocks Dz of all the data sequences D40-D43 need to be read out in the same cycle. Since the data block Dz corresponding to the transmission line L1 has just been written to the buffer BufB1, reading is still being performed from the buffers BufB0-BufB3 after output of address 1 for the buffers BufB0-BufB3 from the read pointer ReadPointer. That is, data blocks DTy have just been read out and the data blocks Dtz have not been read from the buffers BufB0-BufB3 at address 2 yet.

If in this state the write buffer is switched from the buffer BufA0 to the buffer BufB0 as a result of detection of the timing control symbol TC0 at the timing corresponding to the sixth cycle (indicated by mark "*"), the data stored in the buffer BufB0 at addresses 1 and 2 are overwritten by the timing control symbols TC0 and TC1, respectively; that is, the data block DTz stored in the buffer BufB0 at address 2 is erased. In this manner, there may occur an event that the data block DTz stored in the buffer BufB0 at address 2 is erased and hence cannot be read out.

This is considered due to the rule that the write buffer be switched every time a timing control symbol TC0 indicating switching timing is detected. In view of this, the following two cases are regarded as exceptions and the write buffer is not switched in those cases.

Case 1: Timing control symbols TC0-TC3 are received consecutively and repeatedly The allowable size of skews occurring between the transmission lines L0-L3 is determined for each communication scheme. For example, assume a communication scheme in which the transmission symbol number (i.e., the number of timing control symbols TC0 etc.) is four and the allowable size of skews occurring between the transmission lines L0-L3 is five cycles (see FIG. 8). If the write buffer were switched between (i) the buffers BufA0-BufA3 and (ii) the buffers BufB0-BufB3 every time a timing control symbol TC0 is received as a series of timing control symbols TC0-TC3 is received two times consecutively, part of data blocks would be overwritten before being read out when the size of skews becomes larger than four cycles (corresponds to the transmission symbol number).

To avoid the above phenomenon, when timing control symbols TC0-TC3 are received consecutively and repeatedly, the write buffer is not switched between (i) the buffers BufA0-BufA3 and (ii) the buffers BufB0-BufB3 even if a timing control symbol TC0 is received again.

Case 2: Timing control symbols TC0-TC3 are received again within a period corresponding to a predetermined number of cycles after preceding reception of timing control symbols TC0-TC3

For the same reason as in case 1, the write buffer is not switched between (i) the buffers BufA0-BufA3 and (ii) the buffers BufB0-BufB3 when timing control symbols TC0-TC3 are received again within a period corresponding to a predetermined number of cycles after preceding reception of timing control symbols TC0-TC3. It is most appropriate that the "predetermined number" of the term "predetermined number of cycles" be the sum of the number of cycles corresponding to the allowable size of skews between the transmission lines L0-L3 in a communication scheme and the number of cycles of timing control symbols TC0-TC3 prescribed in the communication scheme.

(Read-side Switching Timing Control)

The timing at which the read buffers are switched between the buffers BufA0-BufA3 and the buffers BufB0-BufB3 is timing at which the data stored in all the buffers (planes) BufA0-BufA3 or the buffers BufB0-BufB3 have just been read out. Since a common reading operation is performed in one cycle for all the transmission lines L0-L3, the one read pointer ReadPointer is enough.

Referring to FIG. 7, the timing at which the data stored in all the buffers have been read out is timing (2) at which the data block Z has been read from the immediately-before-switching writing position (1) of the buffer BufA0 that corresponds to address 4.

After the buffer switching, timing control symbols TC0-TC3 are written into all the buffers BufB0-BufB3. The timing at which the timing control symbols TC0-TC3 have been written is timing (3) shown in FIG. 7. After confirming the writing of the timing control symbols TC0-TC3, the read pointer ReadPointer starts address incrementing, whereby the timing control symbols TC0-TC3 and data blocks and b are read from all the buffers BufB0-BufB3.

(Adjustment of the Number of Timing Control Symbols TC0 Etc. (Deskew Symbol Number) at the Time of Reading)

If a timing control symbol TC0-TC3 was removed by one of the elastic buffers EB0-EB3, as shown in FIG. 6 the corresponding one of the write pointer WritePointer0-WritePointer3 increments the address by one and then two in one cycle to add a timing control symbol and make the deskew symbol number equal to the transmission number. However, since the corresponding one of the write pointer WritePointer0-WritePointer3 increments the address by one and then two in one cycle, the state of the corresponding one of the buffers BufA0-BufA3 and BufB0-BufB3 goes closer to an overflow. On the other hand, since the read pointer ReadPointer is shared by all the transmission lines L0-L3, the read pointer ReadPointer cannot be adjusted even if a timing control symbol TC3 is removed by part of the elastic buffers EB0-EB3 corresponding to part of the transmission lines L0-L3.

In view of the above, the control circuit Control Logic has, for the respective transmission lines L0-L3, status flags indicating whether a timing control symbol TC3 has been removed. The control circuit Control Logic detects, on the basis of elastic buffer status signals S0-S3, whether a timing control symbol TC3 has been removed for the transmission lines L0-L3. If detecting that a timing control symbol TC3 has been removed for one of the transmission lines L0-L3, the control circuit Control Logic sets, for the one of the transmission lines L0-L3, a status flag indicating the removal of a timing control symbol TC3. If status flags are set to indicate that a timing control symbol TC3 has been removed for all the transmission lines L0-L3, it can be detected that a timing control symbol TC3 has been removed for all the transmission lines L0-L3. If status flags are set to indicate that a timing control symbol TC3 has been removed for all the transmission lines L0-L3, the read pointer ReadPointer increments the address by two in reading timing control symbols TC0-TC3 from the buffers BufA0-BufA0 or BufB0-BufB3. As a result, the deskew number becomes three, which is smaller than the transmission symbol number by one. This prevents an overflow.

In the transmission system according to the first embodiment, even if any kind of processing (addition or removal) is performed in the elastic buffers EB0-EB3 corresponding to the plural transmission lines L0-L3 in a serial communication using the transmission lines L0-L3, skews caused by the processing can be absorbed and a transmission of the serial communication scheme using the transmission lines L0-L3 is enabled. Therefore, the transmission system can easily accommodate increase in the number of transmission lines.

Even if the number of transmission symbols used for a timing control of the elastic buffers EB0-EB3 or the allowable size of skews between the transmission lines L0-L3 varies depending on the communication scheme, the transmission system can easily accommodate it by adjusting the number of stages of the buffers BufA0-BufA3 and BufB0-BufB3 and the number of bits of the write pointers WritePointer0-WritePointer3 and the read pointer ReadPointer.

The first embodiment is just an exemplary embodiment that may be employed in practicing the invention and should not serve to construe the technical scope of the invention in a limitative manner. The invention can be practiced in various forms without departing from its technical concept or essential features. That is, various modifications, improvements, partial diversions, etc. are possible without departing from the scope of the claims of the invention and are all included in the scope of the claims of the invention.

What is claimed is:

1. A receiving apparatus for receiving data sequences each of which comprises a plurality of data blocks from a plurality of transmission lines, respectively, the apparatus comprising:
a plurality of elastic buffers into each of which the corresponding data sequence is written, a predetermined number of consecutive timing control symbols being inserted into the respective data sequences as markers for data blocks to be read from the respective data sequences at the same cycle, the elastic buffers that adjust numbers of the timing control symbols included in the written data sequences, respectively, the elastic buffers from which the data sequences in each of which the number of the timing control symbols has been adjusted are read in synchronization with a reading clock; and
a deskew circuit into which the data sequences read from the elastic buffers are written, the deskew circuit that adjusts the number of the timing control symbols included in each data sequence so as to be equal to the predetermined number, the deskew circuit from which the data sequences—in each of which the number of the timing control symbols has been adjusted to be equal to the predetermined number—are read at the same cycle in synchronization with the reading clock using the timing control symbols as the markers.

2. The apparatus according to claim 1, wherein each of the elastic buffers adjusts the number of the timing control symbols included in the corresponding data sequence when the elastic buffer overflows or underflows.

3. The apparatus according to claim 1, wherein:
the deskew circuit comprises:
a plurality of deskew buffers into each of which the corresponding data sequence comprising the timing control symbols and the data blocks is written; and
a plurality of write pointers each of which specifies a writing position of the corresponding deskew buffer, if the number of the timing control symbols included in a certain data sequence read from the elastic buffer is larger than the predetermined number, the deskew circuit writes a plurality of timing control symbols into a single writing position of the deskew buffer corresponding to the certain data sequence, and if the number of the timing control symbols included in a certain data sequence read from the elastic buffer is less than the predetermined number, the deskew circuit writes a single timing control symbol into a plurality of writing positions of the deskew buffer corresponding to the certain data sequence.

4. The apparatus according to claim 1, wherein:
the deskew circuit comprises:
a plurality of first deskew buffers; a plurality of second deskew buffers;
a plurality of write selectors each of which selects one of the corresponding first deskew buffer and the corresponding second deskew buffer as a buffer into which the corresponding data sequence comprising the timing control symbols and the data blocks is written;
a read selector that selects one of (i) the first deskew buffers and (ii) the second deskew buffers as buffers from which the data sequences comprising the timing control symbols and the data blocks are read;
a plurality of write pointers each of which specifies a writing position of the one of the corresponding first deskew buffer and the corresponding second deskew buffer selected by the corresponding write selector; and
a read pointer that specifies a reading position of the one of the first deskew buffers and the second deskew buffers selected by the read selector, if each write selector selects the corresponding first deskew buffer, the corresponding data sequence comprising the timing control symbols and the data blocks is written in the corresponding write point specified by the corresponding write pointer, each write selector selects the corresponding second deskew buffer immediately before the timing control symbol is written into the corresponding first deskew buffer, the data sequences comprising the timing control symbols and the data blocks are read from the reading position, which is specified by the read pointer, of the first deskew buffers selected by the read selector, if the read pointer specifies a position immediately before another position where the timing control symbol is written, as the reading position, the read selector selects the plurality of second deskew buffer all at once, the timing control symbols are written into the second deskew buffers, and the timing control symbols are read from the second deskew buffers after the timing control symbols are written into the second deskew buffers.

5. The apparatus according to claim 4, further comprising:
a control circuit, wherein:
if each elastic buffer decreases the number of the timing control symbols by one, the control circuit sets a status flag for the corresponding transmission line, and if the status flags are set to all the transmission lines, the timing control symbols of all the first deskew buffers are skipped.

6. The apparatus according to claim 1, further comprising:
a control circuit, wherein:
if each elastic buffer increases or decreases the number of the timing control symbols, the elastic buffer outputs a status signal to the control circuit, and upon receiving the status signal from any one of the elastic buffers, the control circuit causes the deskew circuit to adjust the number of the timing control symbols included in the data sequence corresponding to the one of the elastic buffer in accordance with the status signal.

7. A data transmission system comprising:
a plurality of transmission lines;
a transmitting apparatus that divides data into a plurality of data sequences and outputs the data sequences through the transmission lines, respectively; and
a receiving apparatus according to claim 1, the receiving apparatus being connected to the transmitting apparatus through the transmission lines.

8. A method for receiving data sequences each of which comprises a plurality of data blocks from a plurality of transmission lines, respectively, the method comprising:
writing into each of a plurality of elastic buffers the corresponding data sequence, a predetermined number of consecutive timing control symbols being inserted into the respective data sequences as markers for data blocks to be read from the respective data sequences at the same cycle;
adjusting numbers of the timing control symbols included in the written data sequences, respectively, reading from the elastic buffers the data sequences in each of which the number of the timing control symbols has been adjusted in synchronization with a reading clock;
writing into a deskew circuit the data sequences read from the elastic buffers;
adjusting the number of the timing control symbols included in each data sequence so as to be equal to the predetermined number; and
reading the data blocks from the deskew circuit at the same cycle in synchronization with the reading clock using the timing control symbols as the markers.

* * * * *